Nov. 22, 1960

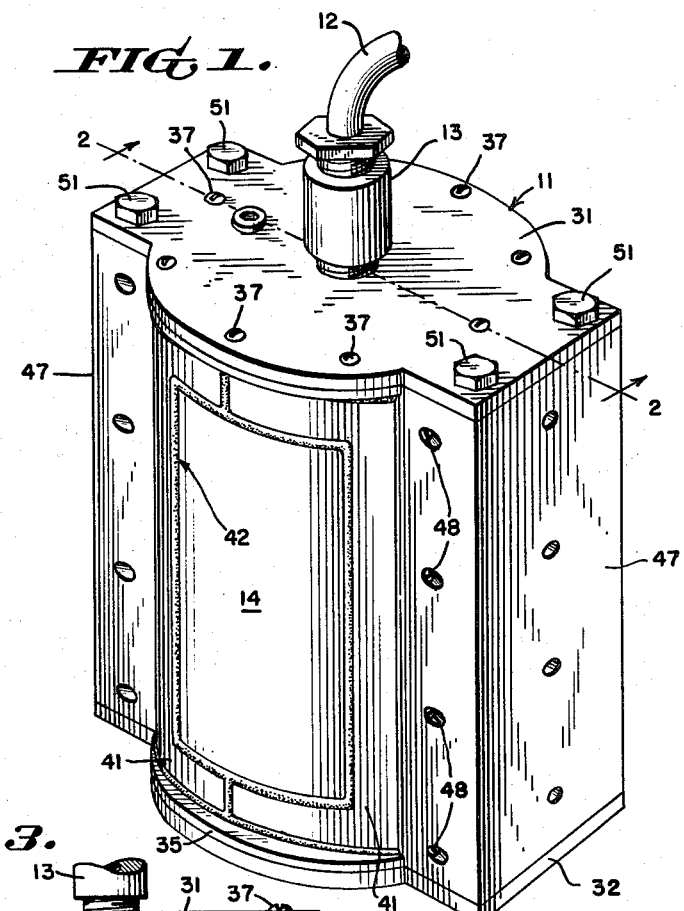
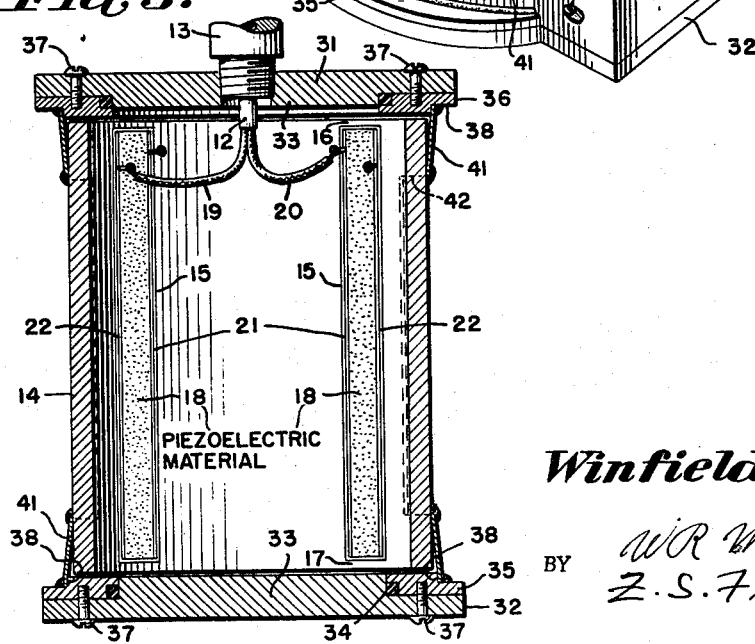
FIG. 1.
FIG. 3.
INVENTOR
Winfield J. Trott

W. J. TROTT 2,961,635

LOW-FREQUENCY UNDERWATER SOUND FLEXURE
MODE RING DRIVE TRANSDUCER

Filed Nov. 9, 1956

INVENTOR
*Winfield J. Trott*

BY

ATTORNEYS

Nov. 22, 1960

W. J. TROTT 2,961,635

LOW-FREQUENCY UNDERWATER SOUND FLEXURE
MODE RING DRIVE TRANSDUCER

Filed Nov. 9, 1956

INVENTOR
Winfield J. Trott

BY *W R Maltby*
*Z S Flax*

ATTORNEYS

United States Patent Office 2,961,635
Patented Nov. 22, 1960

2,961,635

LOW-FREQUENCY UNDERWATER SOUND FLEXURE MODE RING DRIVE TRANSDUCER

Winfield J. Trott, Orlando, Fla., assignor to the United States of America as represented by the Secretary of the Navy Filed Nov. 9, 1956, Ser. No. 621,483

10 Claims. (Cl. 340—8)

(Granted under Title 35, U.S. Code (1952), sec. 266)

The invention described herein may be manufactured and used by or for the Government of the United States of America for governmental purposes without the payment of any royalties thereon or therefor.

The present invention relates to a resonant low frequency underwater transducer and more particularly to such a transducer in which a cylindrical tube is driven in its first flexure mode.

Transducers having a cylindrical tube as the driving element are known, however, the tubes of these transducers are not driven in the first flexure mode. The prior devices are not capable of as low a resonant frequency with the same size tube as are obtainable in the instant invention as flexure drive provides the lowest resonant frequency for any given tube. The present invention is highly efficient as there is no means of coupling between flexure and longitudinal modes of vibration. Many of the prior devices are mechanically complex and require a relatively large mass to function properly. The present invention is mechanically simple and the large compliance and opposed drive permit low transducer weights.

An object of the present invention is the provision of a resonant low frequency underwater transducer which can conveniently be used for echo ranging.

Another object is to provide a resonant low frequency underwater transducer which has a large compliance, low weight and is mechanically simple.

A further object of the invention is the provision of a resonant low frequency underwater transducer which is bi-directional and in which a portion of the vibrating mechanism is decoupled from the water.

Still another object of the invention is to provide a resonant low frequency underwater transducer which requires no pressure compensation for different operating depths.

In the attainment of the foregoing objects a low resonant frequency transducer is obtained by driving a cylindrical tube, in its first flexure mode. In the preferred form of the invention, the cylindrical tube, preferably made of metal, contains four slots for the reception of piezo-electric crystals, and the centerline of these slots and the piezoelectric crystals define the nodes of the cylindrical tubing as it is vibrated in its first flexure mode. The piezo-electric crystals are driven in shear which results in the four quadrants of the cylindrical tube oscillating radially and such that adjacent quadrants move in phase opposition and opposed quadrants are vibrated in phase. Furthermore, two opposed quadrants are decoupled from the water by means of an air space and inertia blocks so that only two opposed quadrants which are vibrating in phase are effetcive to impart a compressional wave to the water.

The exact nature of this invention as well as other objects and advantages thereof will be readily apparent from consideration of the following specification relating to the annexed drawing in which:

Figure 1 shows a perspective view of the transducer of the present invention.

Figure 3 shows a vertical sectional view along line 3—3 of Figure 2.

Figure 2:
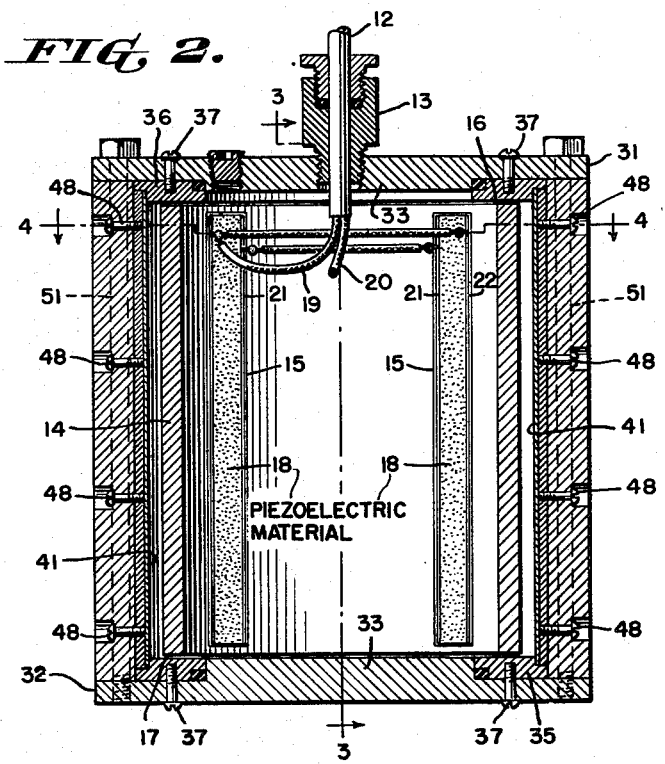
Figure 2 shows a vertical sectional view along line 2—2 of Figure 1.

Referring now to the drawings, wherein like reference characters designate like or corresponding parts throughout the several views there is shown in Figure 1 (which illustrates a preferred embodiment) an underwater transducer generally designated by the numeral 11 which may conveniently be suspended by means of a cable 12 and a cable connector 13. There is provided within the transducer a cylindrical tube 14 preferably made of brass or other suitable metal which contains four slots or apertures 15 which extend for subsantially the entire length of the tube but which terminate short of each end leaving rims 16 and 17 at either end of the tube. Positioned within the slots are piezo-electric crystals 18 which are preferably ADP or barium titanate but which may be any piezo-electric material possessing a cut configuration that yields thickness or face shear. The barium titanate crystals are polarized perpendicular to their longitudinal axis and to the alternating electric field which is applied by means of electrodes 21 and 22 located on the faces of the crystals which abut the walls of the slots or apertures 15. Other than barium titanate, few piezo-electric crystals require polarization. As can best be seen by reference to Figure 4, the cylindrical tube 14 is effectively divided into four quadrants 23, 24, 25, and 26 by the piezo-electric crystals 18. As an alternating potential is applied to the crystals, they deform in shear, which on one-half of the alternating cycle pushes the one quadrant inwardly and the two adjacent quadrants outwardly. Thus two opposite quadrants, 23 and 25 move in phase opposition to opposite quadrants 24 and 26. The electrodes 21 and 22 are effectively insulated from the walls of quadrants by means of any suitable insulating material, for example, paper or Bakelite. The crystals are connected in parallel by leads 19 and 20 and with the realtive polarities shown in Figure 4; of course, as the alternating potential reverses, the polarity on each crystal reverses and the crystal deforms in the opposite direction. The nodes of the vibrating cylinder pass through the centerline of each of the crystals 18, thus as the crystals deform and force adjacent quadrants in opposite directions the center of the crystals actually become the pivot points about which the quadrants move.

Figure 4:
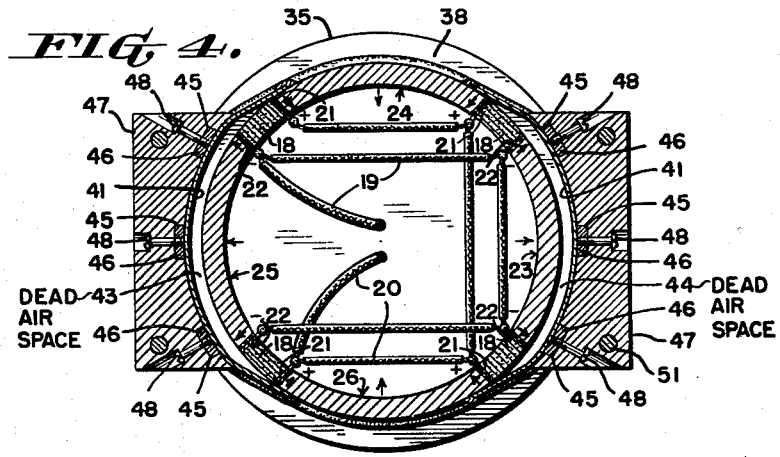
Figure 4 shows a cross-sectional view along line 4—4 of Figure 2.

As shown in Fig. 3, at the ends of the cylindrical tube 14 there are positioned end plates 31 and 32 each of which has a circular raised portion 33 having a gasket material 34 positioned around its periphery. Positioned around the circular raised portions are complementary circular flanges 35 and 36 which are fastened to the end plates by means of screws 37 which as they are tightened force the flanges 35 and 36 down on gaskets 34 to provide a water tight seal between the flanges and the end plates. As can be seen by reference to Figs. 2 and 3, the flanges 35 and 36 are cut away for a portion of their thickness, and over part of their periphery the flanges are cut away to a considerable extent as shown at 38 in Figs. 3 and 4. A shell 41, preferably made of sheet metal such as sheet brass or steel and having two apertures 42, is placed around the cylindrical tube 14 and cut away portions of the flanges 35 and 36 with the aperture oriented so that they are positioned over cut away portions 38 of the flanges. Along the line 3—3 of Fig. 2 and as can be seen by reference to Fig. 3, the diameter of the cut away portions 38 of the flanges 35 and 36 is very nearly equal in diameter to the cylindrical tube 14 and over the other portions of the flanges 35 and 36 the diameter of the cut away portions is greater than the diameter of the cylindrical tube, as shown in Figure 2. The shell 41 is affixed to the cylindrical tube and the flanges by any suitable means such as welding or soldering as can best be seen by reference to Figure 1, and as can be seen by reference to Figure 4, dead air spaces 43 and 44 are left between the shell and the cylindrical tube 14. Keys 46, indicated in Fig. 4, are welded or otherwise suitably affixed to the shell over most of its length and these keys fit into complementary keyways 45, indicated in Fig. 4, cut into inertia blocks 47, and are affixed to inertia blocks 47 preferably made of a block of metal of considerable mass by means of screws 48.

This arrangement holds the shell 41 away from the cylindrical tube 14 over two opposite quadrants 23 and 25 and effectively decouples these two quadrants from the water. As the two quadrants 23 and 25 vibrate they merely act against the air entrapped in the dead air spaces 43 and 44, and in this manner are prevented from imparting any compressional waves to the surrounding water. As can best be seen by reference to Fig. 1 and 2 the inertia blocks 47 are affixed to end plates 31 and 32 by means of bolts 51 which pass through the end plates and the inertia blocks. Lateral motion of the inertia blocks which may tend to take place because of the compression of the air in the dead air spaces 43 and 44 is inhibited by the mass of these blocks, and the inertia blocks cannot impart any vibrations to the surrounding water.

In operation of the device, an alternating electrical potential is applied to the piezo-electric crystals 18 by means of leads 19 and 20 and pairs of electrodes 21 and 22. As two opposed quadrants 24 and 26 are moved outwardly by the action of the piezo-electric crystals deforming in shear, the other two quadrants 23 and 25 are moved inwardly. When the electric potential assumes the opposite polarity, quadrants 24 and 26 are moved inwardly and quadrants 23 and 25 move outwardly. Quadrants 23 and 25, however, are effectively decoupled from the water as has been previously described, therefore, compressional waves are imparted to the water by action of quadrants 24 and 26 which are acting in phase. Thus the transducer acts as a two directional sound source similar to an opposed piston drive.

The transducer may also act as a receiver to detect compressional waves which may be passing through a body of water. When the device is subjected to such waves, the force will act only on quadrants 24 and 26, as quadrants 23 and 25 are decoupled from such action, and as a result voltages will be produced by the crystals 18 across the leads 19 and 20.

The resonant frequency of the transducer is a function of the wall thickness and the mean radius of the cylindrical tube 14 and can be fixed at a very low value by proper choice of dimensions while the Q of the transducer can be independently varied by changing the tube length. These statements are supported by the formulae given below:

Resonant frequency $f$ (in cycles/sec.)

$$= \frac{h}{2\pi r^2}\sqrt{\frac{3E}{5d}} \quad Q = \frac{6.5cr}{d_0 b}\sqrt{\frac{d^3}{E}}$$

$r$ = mean radius of cylindrical tube 14
$h$ = tube wall thickness
$b$ = tube length
$d$ = density of tube material
$E$ = Young's modulus of tube
$c$ = speed of sound in water
$d_0$ = density of water The above formula for resonant frequency is the classic formula showing the basic relation of the parameters describing the vibration of a cylinder, $$\frac{h}{r^2}\sqrt{\frac{E}{d}}$$

modified by $$\frac{1}{2\pi}\sqrt{\frac{3}{5}}$$

which latter is the factor which takes into account the particular mode of vibration disclosed. The formula for Q is derived from the general expression for Q. This is equal to the sum of the kinetic energies of the vibrating bodies and the water, divided by the energy radiated into the water. Approximate formulae for all of these factors are to be found in any standard text book on acoustics.

Figure 5:
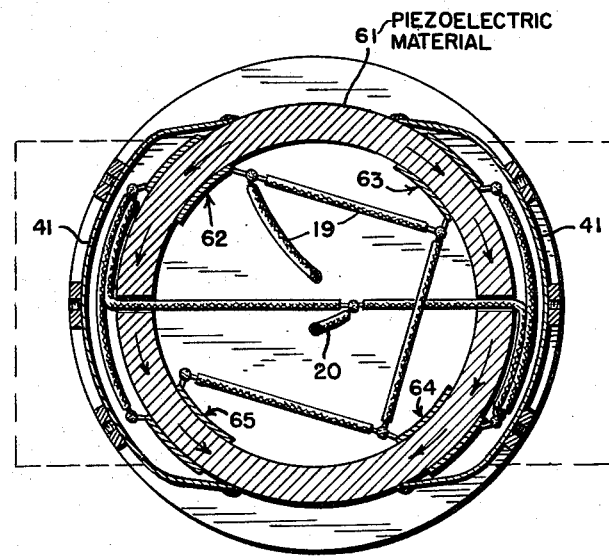
Figure 5 shows another embodiment in cross-section.

In an alternate embodiment of the invention illustrated in cross-section in Fig. 5, the cylindrical tubing 14 and piezo-electric crystals 18 can be replaced by a barium titanate cylinder 61 polarized circumferentially and electroded radially at the four nodes of the cylinder as shown by the numerals 62, 63, 64 and 65. In other respects this embodiment is essentially the same as that illustrated in Figs. 1–4 except that the shell 41 must be affixed to the barium titanate cylinder by means of a suitable adhesive rather than by welding.

Figure 6:
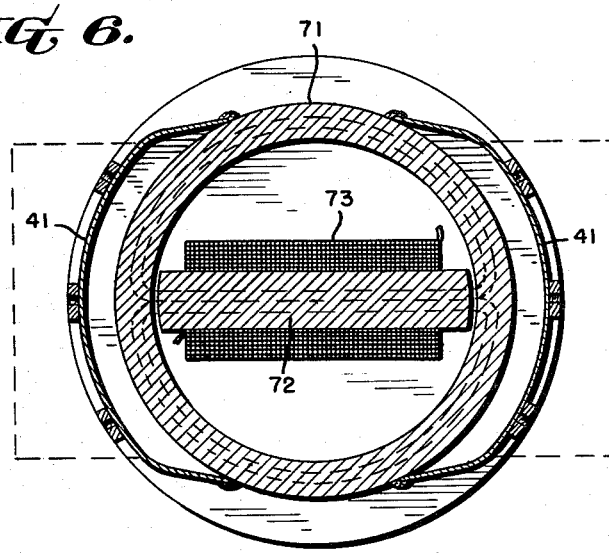
Figure 6 illustrates another embodiment in cross-section.

Figure 6 illustrates another embodiment of the invention in which the cylindrical tube 14 and the piezo-electric crystals 18 are replaced by a ferromagnetic tube 71, and a permanent magnet 72 and coaxial alternating current driving coil 73 mounted within the tubing. The reluctance of the flux path through the tube and magnet is varied by the alternating current thus driving the tube 71 at the antinodes. As two opposite quadrants of the tube are moved inwardly by the magnet the other two quadrants are moved outwardly and on the other half of the alternating current cycle the reverse takes place. In all other respects this embodiment is the same as that illustrated by Figs. 1–4; the shell 41 can be welded to tube 71 in the same manner as it is welded to the cylindrical tube 14.

The embodiments of the invention disclosed in Figs. 5 and 6 may also be used to detect compressional waves which may be present in a body of water. The transducer will produce suitable voltages which may be amplified and fed to a suitable indicator system (not shown).

The present invention thus provides a resonant, efficient, low frequency underwater transducer for use in echo ranging in which a cylindrical tube is driven in its first flexure mode. This transducer has a large compliance and opposed piston drive which permit a low transducer weight. Also, no pressure compensation for different operating depths is necessary because of the high rigidity of the cylindrical tube 14.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention set forth in the appended claims.

What is claimed and desired to be protected by Letters Patent of the United States is:

1. An underwater sound transducer comprising a substantially cylindrical tube, means for driving adjacent quadrantal portions of said tube in phase opposition and means for decoupling two opposite quadrantal portions of said tube from a surrounding body of water.

2. An underwater sound transducer comprising a substantially cylindrical tube, means for driving adjacent quadrantal portions of said tube in phase opposition and means for decoupling two opposite quadrantal portions of said tube from a surrounding body of water comprising a shell surrounding said tube, inertia blocks affixed to said shell over a portion of its periphery, said shell and inertia blocks being spaced from said tube over said two opposite quadrants, thereby creating a dead air space between said shell and said tube.

3. An underwater sound transducer comprising a cylindrical tube, means for driving adjacent quadrantal portions in phase opposition, and means for decoupling two opposite quadrantal portions of said tube from a surrounding body of water comprising a pair of flanges abutting the ends of said tube, said flanges having a cut away portion of substantially elliptical configuration, the minor axis of which is substantially equal to the outer diameter of said tube, a shell fitting around said tube and the cut away portion of said flanges, and being affixed to said tube over a portion of its periphery where the outer diameter of the cut away portion of said flanges is nearly equal to the diameter of said tube, but being spaced from said tube over the portion of the periphery of said tube where the outer diameter of said cut away portion of said flanges is substantially greater than the diameter of said tube, and means affixed to said shell for holding it spaced from said tube for the length of said tube.

4. The transducer of claim 3 in which said means for holding said shell spaced from said tube comprises a plurality of keys affixed to said shell and a pair of inertia blocks having a plurality of slots for receiving said keys and fastening means for fastening said keys to said blocks.

5. An underwater sound transducer comprising a tube having four substantially equally spaced apertures dividing said tube into quadrants, piezo-electric material positioned within said apertures, said piezo-electric material being polarized perpendicular to the longitudinal axis of said tube and having electrodes positioned thereon for applying an electric field perpendicular to the longitudinal axis of said tube and to the polarization of said piezo-electric material, and means for decoupling two opposite quadrants of said tube from a surrounding body of water.

6. The transducer of claim 5 in which said means for decoupling two opposite quadrants of said tube from the medium which surrounds said transducer comprises a shell which surrounds said tube, inertia blocks affixed to said shell over a portion of its periphery, said shell and inertia blocks being spaced from said tube over said two opposite quadrants thereby creating a dead air space between said shell and said tube.

7. An underwater sound transducer comprising a cylindrical tube of ferromagnetic material, a magnet polarized perpendicular to the longitudinal axis of said tube located within said tube, means to vary the reluctance of the flux path of said tube and said magnet whereby said tube is vibrated in a manner such that adjacent quadrants of said tube move in phase opposition, and means for decoupling two opposite quadrants of said tube from a surrounding body of water.

8. The combination of claim 5 further defined in that the piezo-electric material is barium titanate.

9. The combination of claim 2 further defined in that the substantially cylindrical tube is of circumferentially polarized piezo-electric material and electrodes separate adjacent quadrantal portions.

10. The combination of claim 9 further defined in that the piezo-electric material is barium titanate.

References Cited in the file of this patent
UNITED STATES PATENTS

| | | |
|---|---|---|
| 1,927,141 | Thomas | Sept. 19, 1933 |
| 2,420,864 | Chilowsky | May 20, 1947 |
| 2,434,143 | Chilowsky | Jan. 6, 1948 |
| 2,725,219 | Firth | Nov. 29, 1955 |